United States Patent
Hasegawa et al.

(10) Patent No.: US 11,369,990 B2
(45) Date of Patent: Jun. 28, 2022

(54) FILM FORMING METHOD

(71) Applicant: FUJIFILM Corporation, Tokyo (JP)

(72) Inventors: Masataka Hasegawa, Minami-ashigara (JP); Hayato Kanazawa, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/906,146

(22) Filed: Jun. 19, 2020

(65) Prior Publication Data

US 2020/0316642 A1 Oct. 8, 2020

Related U.S. Application Data

(63) Continuation of application No. PCT/JP2018/045260, filed on Dec. 10, 2018.

(30) Foreign Application Priority Data

Dec. 22, 2017 (JP) .............................. JP2017-246042

(51) Int. Cl.
*B05D 3/06* (2006.01)
*B05D 1/02* (2006.01)
*B05D 3/12* (2006.01)
*G02F 1/13* (2006.01)
*C23C 24/04* (2006.01)

(52) U.S. Cl.
CPC .............. *B05D 3/06* (2013.01); *B05D 1/02* (2013.01); *B05D 3/12* (2013.01); *G02F 1/13* (2013.01); *C23C 24/04* (2013.01)

(58) Field of Classification Search
None
See application file for complete search history.

(56) References Cited

U.S. PATENT DOCUMENTS 8,282,999 B2 * 10/2012 Sinha ................ H01L 21/31058
427/560

FOREIGN PATENT DOCUMENTS

| JP | 8-330303 A | 12/1996 | |
| JP | 2002-75641 A | 3/2002 | |
| JP | 2003-142398 A | 5/2003 | |
| JP | 2004-46153 A | 2/2004 | |
| JP | 2004046153 A | * 2/2004 | |
| JP | 2004-195340 A | 7/2004 | |
| JP | 2004195340 A | * 7/2004 | ............ B01L 3/5085 |
| JP | 2007-27536 A | 2/2007 | |
| JP | 2007027536 A | * 2/2007 | |

(Continued)

OTHER PUBLICATIONS

Japanese Office Action for corresponding Japanese Application No. 2019-560979, dated Jun. 15, 2021, with English translation.

(Continued)

*Primary Examiner* — Michael P. Rodriguez
(74) *Attorney, Agent, or Firm* — Birch, Stewart, Kolasch & Birch, LLP

(57) ABSTRACT

An object of the present invention is to provide a film forming method capable of improving a film forming speed in the film formation by an aerosol deposition. The object is achieved by aerosolizing a raw material liquid including a film forming material, supplying the generated aerosol to a base material vibrating at a frequency of 10 kHz or less, and forming a film including the film forming material on the base material.

10 Claims, 2 Drawing Sheets

(56) References Cited

FOREIGN PATENT DOCUMENTS

| JP | 2009-91604 A | | 4/2009 | |
|---|---|---|---|---|
| JP | 2009091604 A | * | 4/2009 | |
| JP | 2012-216411 A | | 11/2012 | |
| JP | 2012216411 A | * | 11/2012 | ............. B82Y 30/00 |

OTHER PUBLICATIONS

International Preliminary Report on Patentability and English translation of the Written Opinion of the International Searching Authority (PCT/IB/326, PCT/IB/373 and PCT/ISA/237) dated Jul. 2, 2020 for Application No. PCT/JP2018/045260.
International Search Report (PCT/ISA/210) dated Feb. 5, 2019 for Application No. PCT/JP2018/045260 with an English translation.
Chinese Office Action for corresponding Chinese Application No. 201880082156.5, dated Dec. 3, 2021, with an English translation.

* cited by examiner

FILM FORMING METHOD

CROSS-REFERENCE TO RELATED APPLICATIONS

This application is a Continuation of PCT International Application No. PCT/JP2018/045260 filed on Dec. 10, 2018, which claims priority under 35 U.S.C. § 119(a) to Japanese Patent Application No. 2017-246042 filed on Dec. 22, 2017. The above application is hereby expressly incorporated by reference, in its entirety, into the present application.

BACKGROUND OF THE INVENTION

1. Field of the Invention

The present invention relates to a film forming method by an aerosol deposition.

2. Description of the Related Art

As a film manufacturing technique of thin film, a technique for forming a film from a film forming material by aerosolizing a raw material liquid including the film forming material, supplying the generated aerosol to a base material by transporting the generated aerosol with a carrier gas, and vaporizing a solvent in the aerosol adhering to the base material has been known. The technique for forming a film is also called an aerosol deposition.

For example, JP1996-330303A (JP-H08-330303A) discloses a thin film forming method in which a sol-gel solution which contains water, film raw material, and an organic solvent dissolving the film raw material is aerosolized by atomizing the sol-gel solution using an ultrasonic vibration or the like, and the aerosol adheres to a base material (substrate) vibrating 15 kHz to 2 MHz to form a thin film layer.

In addition, JP2002-075641A discloses a producing method of an organic electroluminescence thin film in which a raw material liquid dissolving or dispersing in a solvent an organic material which serves as a raw material of a light emitting layer or a carrier transport layer of an organic electroluminescence element is aerosolized, and fine particles of the organic material generated by vaporizing the solvent in the aerosol adhere to a base material (substrate) to form a thin film of the organic material on the base material.

SUMMARY OF THE INVENTION

In the aerosol deposition, a film is formed using very small aerosol compared to liquid droplets in ink-jet, spray coating, and the like.

Therefore, according to the aerosol deposition, a film having high following property (coverage property) to an unevenness and the like of the base material and having a uniform thickness can be precisely formed.

On the other hand, the aerosol deposition has problems that a film forming speed is slow, and forming a film with a target thickness takes a long time even though a thin film.

An object of the present invention is to solve such problems in the related art, and is to provide a film forming method capable of improving the film forming speed in the film formation by the aerosol deposition.

In order to solve the problems, the present invention has the following configuration.

[1] A film forming method comprising:
aerosolizing a raw material liquid including a film forming material;
supplying the aerosol to a base material vibrating at a frequency of 10 kHz or less; and
forming a film of the film forming material on the base material.

[2] The film forming method according to [1],
in which the vibration of the base material is started before supplying the aerosol to the base material.

[3] The film forming method according to [1] or [2],
in which the formed film is irradiated with an active radiation after forming a film of the film forming material on the base material.

[4] The film forming method according to any one of [1] to [3],
in which the aerosol is supplied to the base material while heating the base material.

[5] The film forming method according to [4],
in which the base material is heated such that a temperature of a surface of the base material is 100° C. or higher.

[6] The film forming method according to any one of [1] to [5],
in which a vibration speed of the base material is 0.1 mm/sec or more.

[7] The film forming method according to any one of [1] to [6],
in which the vibration of the base material is performed by one or more of irradiating the base material with a sound wave, blowing of air to the base material, and vibrating a supporting means of the base material.

[8] The film forming method according to any one of [1] to [7],
in which a film forming surface of the base material has a region having lyophilicity to the raw material liquid and a region having liquid repellency to the raw material liquid.

[9] The film forming method according to any one of [1] to [8],
in which a surface treatment of the base material is performed before supplying the aerosol to the base material.

[10] The film forming method according to [9],
in which the surface treatment of the base material is one or more of a rubbing treatment, a lyophilic treatment, a liquid-repellent treatment, and a formation of a base layer.

[11] The film forming method according to any one of [1] to [10],
in which the film forming material is a liquid crystal compound.

According to the film forming method of the present invention, it is possible to improve the film forming speed in the film formation by the aerosol deposition.

DESCRIPTION OF THE PREFERRED EMBODIMENTS

Figure 1:
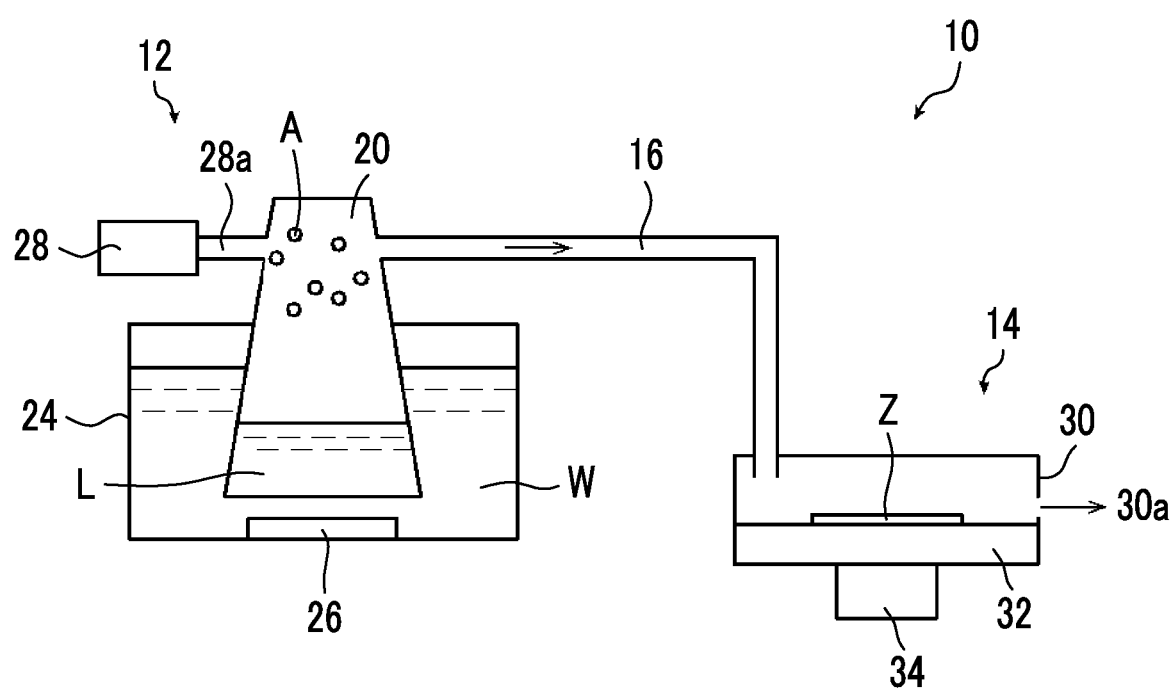
FIG. 1 is a conceptual view for describing an example of a film forming method of the present invention.

Hereinafter, the film forming method according to an embodiment of the present invention will be described in detail based on suitable embodiments shown in the accompanying drawings.

The embodiments described below exemplify an example of the present invention, and the scope of the present invention is not limited thereto. In addition, in order to clarify the description of each constitutional member, the dimensions of each constitutional member in the drawings are appropriately changed. Therefore, the scale in the drawings is different from the actual one.

Furthermore, in the present specification, a numerical range represented by using "to" means a range including numerical values described before and after "to" as a lower limit value and an upper limit value.

FIG. 1 conceptually shows an example of a film forming apparatus for the film forming method according to the embodiment of the present invention.

The film forming apparatus 10 shown in FIG. 1 is an apparatus for forming a film on a base material Z by the above-described aerosol deposition, and has an aerosol generating portion 12 and a film forming portion 14. The aerosol generating portion 12 and the film forming portion 14 are connected by a guide pipe 16.

Except for vibrating the base material Z at 10 kHz or less and supplying the aerosol A to the base material Z, the film forming method according to the embodiment of the present invention basically forms a film by a known aerosol deposition (mist deposition).

That is, the film forming apparatus 10 performing the film forming method according to the embodiment of the present invention basically forms a film by a known aerosol deposition, except that the film forming portion 14 has a vibration device 34 described later and the base material Z is vibrated at a frequency of 10 kHz or less by the vibration device 34 during supplying the aerosol A. Therefore, in addition to the members shown in the drawings, the film forming apparatus 10 may have various members included in the known apparatus for forming a film by the aerosol deposition, such as supply means for the raw material liquid L, collecting means for the aerosol A (raw material liquid L) which does not serve for the film formation, and purifying means for carrier gas.

The aerosol generating portion 12 aerosolizes the raw material liquid L which is obtained by dissolving or dispersing a film forming material in a solvent or a dispersion medium, and supplies the generated aerosol A to the guide pipe 16. The aerosol A is sent to the film forming portion 14 through the guide pipe 16.

In the film forming apparatus 10, the aerosol generating portion 12 has a raw material container 20 containing the raw material liquid L, a container 24 containing a part of the raw material container 20, an ultrasonic vibrator 26 disposed on a bottom surface of the container 24, and a gas supply means 28 supplying the carrier gas for sending the aerosol A to the film forming portion 14.

Water W is contained in the container 24. The water W is contained in the container 24 in order to transmit ultrasonic waves generated by the ultrasonic vibrator 26 to the raw material liquid L. Therefore, the ultrasonic vibrator 26 is immersed in the water W. In addition, at least a part of the container 24 containing the raw material container 20 is also immersed in the water W.

In a case where the ultrasonic vibrator 26 vibrates, the water W propagates the ultrasonic vibration so as to ultrasonically vibrate the raw material container 20, thereby ultrasonically vibrating the raw material liquid L contained in the raw material container 20. By ultrasonically vibrating the raw material liquid L, the raw material liquid L is aerosolized and the aerosol A of the raw material liquid L is generated. That is, the raw material container 20, the container 24, and the ultrasonic vibrator 26 constitute a so-called ultrasonic atomizer.

In the film forming method according to the embodiment of the present invention, the method for ultrasonically vibrating the raw material liquid L is not limited to the method for ultrasonically vibrating the raw material liquid L by propagating ultrasonic waves using the water W, that is, an intermediate solution. For example, a known method used for ultrasonic vibration of the raw material liquid L in the aerosol deposition can be used, such as a method for ultrasonically vibrating the raw material liquid L through the raw material container 20 by disposing the ultrasonic vibrator 26 on a lower surface of the raw material container 20, and a method for ultrasonically vibrating the raw material liquid L directly by disposing the ultrasonic vibrator 26 on a bottom surface of the raw material container 20.

In the film forming method according to the embodiment of the present invention, the film forming material (film to be formed) is not limited, and various materials which can be formed into a film by the aerosol deposition can be used.

Examples thereof include liquid crystal compounds, organic electroluminescent materials, metal alkoxide compounds, silicon compounds such as silicon dioxide (silica) and tetraethoxysilane, ceramic powders such as lead zirconate titanate (PZT) and aluminum oxide (alumina), metal oxides of zinc, alumina, zirconia, silica, perovskite, and the like, transparent electrode materials such as indium tin oxide (ITO), silver halide, and metal nanoparticles, polysaccharides such as gelatin, polyvinyl alcohol, polyvinyl pyrrolidone, starch, water-soluble resins such as cellulose and derivatives thereof, polyethylene oxide, polyvinyl amine, chitosan, polylysine, polyacrylic acid, polyalginic acid, polyhyaluronic acid, and carboxy cellulose, and solutions including a molecule which becomes an oxide semiconductor or an organic semiconductor or a carbon nanotube.

The solvent or the dispersion medium used in the preparation of the raw material liquid L is not limited, and according to the film forming material, various liquids can be used as long as a liquid can dissolve or disperse the film forming material.

Examples thereof include organic solvents, for example, amides such as N,N-dimethylformamide, sulfoxides such as dimethyl sulfoxide, heterocyclic compounds such as pyridine, hydrocarbons such as benzene and hexane, alkyl halides such as chloroform and dichloromethane, esters such as methyl acetate and butyl acetate, ketones such as acetone, methyl ethyl ketone, methyl isobutyl ketone, and cyclohexanone, ethers such as tetrahydrofuran and 1,2-dimethoxyethane, alkyl alcohols such as methanol, ethanol, and propanol, and the like. In addition, water is also exemplified as the solvent or dispersion medium. It is preferable to use any one of ion exchange water, distilled water, and pure water as the water.

The solvent and the dispersion medium may be used as a mixture of two or more thereof.

The raw material liquid L may include various binders and coupling agents as necessary for the purpose of improving adhesiveness of the film after the film formation, improving the film hardness, and the like.

In addition, the raw material liquid L may include a polymerizable monomer as necessary in order to increase the film hardness of the film to be formed.

The ultrasonic vibrator 26 is not limited, and various ultrasonic vibrators (generating means for ultrasonic vibration) used for aerosolizing (misting) the raw material liquid L in the aerosol deposition can be used.

The frequency of the ultrasonic vibration by the ultrasonic vibrator 26 is also not limited, and it is sufficient that the frequency of the ultrasonic vibration, which can aerosolize the raw material liquid L, is appropriately set according to composition and the like of the raw material liquid L. The frequency of the ultrasonic vibration for aerosolizing the raw material liquid L is approximately 15 kHz to 3 MHz.

In the aerosol deposition, the particle size of the aerosol A can be adjusted by adjusting the density (concentration) of the raw material liquid L, surface tension of the raw material liquid L, and frequency of the ultrasonic vibration.

Specifically, in a case where the density of the raw material liquid L is p, the surface tension of the raw material liquid L is a, and the frequency of the ultrasonic vibration is f, the particle size d of the aerosol can be obtained by the following equation.

$$d=0.68[(\pi^*\sigma)/(\rho^* f^2)]^{1/2}$$

The equation is described in J. Accousticai Sot. Amer. 34 (1962) 6.

The particle size of the aerosol A in the aerosol deposition can also be measured by forming at least a part of the guide pipe 16 from a light transmitting material, injecting laser sheet light into the guide pipe 16 using a laser sheet light source for visualization, capturing an image with a high-speed camera, and analyzing the image.

Furthermore, the particle size of the aerosol A may be measured by visualizing the aerosol A using a commercially available fine particle visualization system. Examples of the fine particle visualization system include ViEST manufactured by SHIN NIPPON AIR TECHNOLOGIES CO., LTD. At the time of measuring (calculating) the diameter by visualizing the aerosol A, image processing may be performed as necessary.

In the film forming method according to the embodiment of the present invention, the particle size of the aerosol A is not limited, but is preferably 20 to 50 μm, more preferably 10 to 20 μm, and still more preferably 1 to 10 μm.

Except for a case where the particle size unexpectedly changes due to collision and the like of the aerosol A's, it is considered that the particle size of the aerosol A is basically the same from the generation of the aerosol A to the moving in the guide pipe 16 to the adhesion to the base material Z.

In the film forming method according to the embodiment of the present invention, the aerosolization of a raw material liquid L is not limited to the ultrasonic vibration of the raw material liquid L, and various known aerosolizing method for the raw material liquid L, which are used in the aerosol deposition, can be used.

Examples of the aerosolizing method include a pressuring type, a rotating disk type, an orifice vibration type, and an electrostatic type. The pressuring type is a method of aerosolization by colliding a liquid with a gas having increased flow velocity by applying pressure. The rotating disk type is a method in which liquid dropped on a high-speed rotating disk is aerosolized at an edge of the disk by centrifugal force. The orifice vibration type is a method in which liquid droplets are cut and aerosolized by applying vibration at the time of passing the liquid droplets through an orifice having fine holes. The electrostatic type is a method in which liquid is aerosolized by applying a DC or AC voltage to a thin tube through which liquid droplets pass.

The gas supply means 28 is a means for introducing the carrier gas into the raw material container 20 through a gas supply pipe 28a. By the carrier gas supplied from the gas supply means 28, the aerosol A floating in the raw material container 20 is transported from the raw material container 20 to the film forming portion 14 through the guide pipe 16.

The gas supply means 28 is not limited, various known gas supply means used for supplying the carrier gas in the aerosol deposition, such as a fan, a blower, a gas cylinder, and compressed air, can be used. Alternatively, the carrier gas may be supplied to the raw material container 20 by suction from an outlet 30a of the film forming portion 14 described later.

The supply amount of gas by the gas supply means 28 is not also limited. Here, it is preferable that the gas supply means 28 supplies the carrier gas so that gas flow in the raw material container 20, the guide pipe 16, and the film forming portion 14 (in a casing 30 described later) is a laminar flow. In a case where the gas flow by the carrier gas becomes the laminar flow, a film having a uniform thickness can be formed on the surface of the base material Z.

The supply amount of the carrier gas in the gas supply means 28 is preferably $3\times10^{-3}$ to $5\times10^{-3}$ m³/min and more preferably $1\times10^{-3}$ to $3\times10^{-3}$ m³/min.

In the film forming method according to the embodiment of the present invention, the carrier gas is not limited, and various known gases used as a carrier gas in the aerosol deposition, such as inert gas of argon, nitrogen, and the like, air, gas obtained by aerosolizing the film forming material, and gas obtained by aerosolizing another film forming material, can be used.

On the other hand, the film forming portion 14 has a casing 30, a support 32 supporting the base material Z, and a vibration device 34. The support 32 is disposed in the casing 30, and the vibration device 34 is abutted and fixed to a lower surface of the casing 30.

In the film forming method according to the embodiment of the present invention, the base material Z is not limited, and various materials which are used as a base material in the film formation by the aerosol deposition can be used.

Examples thereof include a resin film consisting of a resin material such as polyethylene (PE), polyethylene naphthalate (PEN), polyamide (PA), polyethylene terephthalate (PET), polyvinyl chloride (PVC), polyvinyl alcohol (PVA), polyacrylonitrile (PAN), polyimide (PI), transparent polyimide, poly(methyl methacrylate) resin (PMMA), polycarbonate (PC), polyacrylate, polymethacrylate, polypropylene (PP), polystyrene (PS), acrylonitrile-butadiene-styrene copolymer (ABS), cycloolefin copolymer (COC), cycloolefin polymer (COP), triacetyl cellulose (TAC), and ethylene-vinyl alcohol copolymer (EVOH), and biodegradable film composed of polylactic acid, polyglycolic acid, chitin, chitosan, and the like.

In addition, as the base material Z, microchannel chip base materials such as micro-total analysis systems (μTAS), various circuit base materials on a silicon wafer, biotemplate base materials, and the like can also be used. That is, in the film forming method according to the embodiment of the present invention, various members having unevenness on the surface can be used as the base material Z.

In the film forming method according to the embodiment of the present invention, before forming a film on the base material Z, a film forming surface of the base material Z may be subjected to a surface treatment as necessary.

As the surface treatment of the base material Z, various treatments can be used according to the types of the solvent (dispersion medium) included in the raw material liquid L and the film forming material. Examples of the surface treatment of the base material Z include a corona treatment and a plasma treatment for improving lyophilicity (wettability). In a case of using water as the solvent of the raw material liquid L, a hydrophilic treatment of the base material Z by ultraviolet (UV) irradiation, ozone irradiation, UV ozone cleaning, and the like is also effective.

In addition, in a case of forming a film of a liquid crystal compound, a rubbing treatment for imparting alignment to the base material Z may be performed. The general method of the rubbing treatment is described in, for example, "Handbook of Liquid crystals" (published by Maruzen, Oct. 30, 2000).

Any of such surface treatments of the base material Z may be performed by a known method.

Furthermore, as the surface treatment of the base material Z, formation of a base layer can also be used for the purpose of improving adhesiveness, improving or imparting lyophilicity, improving or imparting liquid repellency, ensuring surface smoothness, and the like. It is sufficient that a known method such as a coating method and a printing method is performed for the formation of a base layer according to the base layer to be formed.

In the film forming method according to the embodiment of the present invention, the film forming surface of the base material Z may have a region having lyophilicity to the raw material liquid L and a region having liquid repellency to the raw material liquid L.

In the present invention, having lyophilicity refers to that a contact angle between the film forming surface of the base material Z and the raw material liquid L is less than 90°. On the other hand, having liquid repellency refers to that the contact angle between the film forming surface of the base material Z and the raw material liquid L is 90° or more.

In the following description, in the film forming surface of the base material Z, the region having lyophilicity to the raw material liquid L is also referred to as a "lyophilic region" and the region having liquid repellency to the raw material liquid L is also referred to as a "liquid-repellent region".

In the aerosol deposition, basically, the aerosol A is supplied substantially uniformly over the entire surface of the base material Z. That is, in the aerosol deposition, it is not possible to selectively form a partial film on the base material Z.

In contrast, in a case of forming the lyophilic region and the liquid-repellent region on the deposition surface of the base material Z with a pattern, by removing the aerosol A from the liquid-repellent region and selectively adhering to the lyophilic region, it is possible to forming a patterned film on the base material Z by the aerosol deposition. For example, a target wiring pattern can be formed by forming a wiring pattern of the lyophilic region, forming the other regions as the liquid-repellent region, and forming a film by the aerosol deposition.

As will be described later, in particular, in the film forming method according to the embodiment of the present invention, since the aerosol is supplied to the base material Z while vibrating the base material Z, it is possible to efficiently move the aerosol A from the liquid-repellent region to the lyophilic region, and suitably form a patterned film.

As the formation of the lyophilic region, that is, a lyophilic treatment, and the formation of the liquid-repellent region, that is, a liquid-repellent treatment on the base material Z, a known method can be used according to composition of the raw material liquid L, particularly the solvent used in the raw material liquid L.

Examples of forming a water-repellent pattern include a method in which, in a case where water is used as the solvent of the raw material liquid L, the entire surface of the base material Z is subjected to a UV ozone treatment to be hydrophilic, and then water-repellent region is coated with a fluorine-based surfactant by microcontact printing or the like.

The support 32 is a supporting means for mounting and supporting the base material Z.

In the film forming method according to the embodiment of the present invention, the supporting means for the base material Z is not limited to the support 32 mounting the base material Z, and various known supporting means for a sheet-like material (a plate-like material and a film-like material), such as a supporting means for sandwiching an end portion of the sheet-like material, can be used.

In a case of roll-to-roll described later, a roller in a supplying portion of the aerosol A, which transports the base material Z, a drum (can) in the supplying portion of the aerosol A, which winds and transports the base material Z, and the like act as the supporting means for the base material Z. The roller transporting the base material Z is, for example, a transport roller, a pair of the transport rollers, and the like.

The vibration device 34 is a vibration device which vibrates the base material Z at a frequency of 10 kHz or less at the time of supplying the aerosol A to the base material Z.

In the film forming portion 14, the support 32 is provided so as to be abutted to the bottom surface (inner wall surface) of the casing 30. The vibration device 34 is provided so as to be abutted to the lower surface of the casing 30. Therefore, in a case where the vibration device 34 vibrates the casing 30, the support 32 is vibrated, and the base material Z supported by the support 32 is vibrated. In the present invention, the aerosol A is supplied to the base material Z while vibrating the base material Z at a frequency of 10 kHz or less. Since the film forming method according to the embodiment of the present invention has such a configuration, the film forming speed by the aerosol deposition is improved.

As described above, in the film formation by the aerosol deposition, a film having high following property (coverage) and having a uniform thickness can be precisely formed.

On the other hand, the film formation by the aerosol deposition has problems that the film forming speed, that is, the film forming rate is low, forming a film having a target thickness takes a long time, and productivity is low.

In contrast, in the film forming method according to the embodiment of the present invention, the aerosol A is supplied to the base material Z while vibrating the base material Z at a frequency of 10 kHz or less in the film formation by the aerosol deposition.

Thus, in the film forming method according to the embodiment of the present invention, the film forming speed in the film formation by the aerosol deposition is improved.

The reason why the film forming speed is improved by supplying the aerosol A to the base material Z while vibrating the base material Z at a frequency of 10 kHz or less is not clear, but is assumed as follows.

In the film formation by the aerosol deposition, since the aerosol A adheres to the base material Z and the solvent is vaporized, a film of the film forming material in the aerosol A is formed.

In the aerosol deposition, a sea-island like film is formed by adhering the aerosol A to the base material Z and drying the aerosol A. Here, the aerosol A not fixed to the base material Z is discharged from the base material Z as rolling down. Therefore, in the aerosol deposition in the related art, it is considered that many aerosols A are not effectively served for the film formation, and the film forming speed is low.

In contrast, in the film forming method according to the embodiment of the present invention in which the aerosol A is supplied while vibrating the base material Z, it is considered that, by a reciprocation of the base material Z, it is possible to suppress the aerosol A from rolling down the base material, and by moving the aerosol A on the base material Z and colliding the aerosol A's with each other, liquid droplets of the aerosol A become large and are easily fixed to the base material Z, thereby improving the film forming speed.

In the film forming method according to the embodiment of the present invention, the frequency of vibrating the base material Z is 10 kHz or less.

In a case where the aerosol A adheres to the base material Z, in a state before the solvent is vaporized, the aerosol A's are bonded to each other to become a liquid similar to the raw material liquid L. Here, in a case where the base material Z is vibrated at a frequency of more than 10 kHz, the liquid similar to the raw material liquid L adhering to the base material Z is in a state of being ultrasonically vibrated, is aerosolized again and separated from the surface of the base material Z. Therefore, in a case where the base material Z is vibrated at a frequency of more than 10 kHz, the film forming speed is reduced.

In the film forming method according to the embodiment of the present invention, the frequency of vibrating the base material Z is preferably 10 kHz or less, more preferably 5 kHz or less, and still more preferably 1 kHz or less.

In the film forming method according to the embodiment of the present invention, the lower limit of the frequency of vibrating the base material Z is not limited.

In order to more suitably obtain the effect of improving the film forming speed, the frequency of vibrating the base material Z is preferably 50 Hz or more, more preferably 100 Hz or more, and still more preferably 200 Hz or more.

In the film forming method according to the embodiment of the present invention, the speed of vibrating the base material Z is not also limited.

However, in order to more suitably obtain the effect of improving the film forming speed, it is preferable to vibrate the base material Z at a certain speed or higher. The speed of vibrating the base material Z is preferably 0.1 mm/sec or more, more preferably 0.5 mm/sec or more, and still more preferably 1 mm/sec or more.

On the contrary, in a case where the speed of vibrating the base material Z is too high, problems such as the load on the apparatus increases, the load on the base material Z increases, the aerosol A easily rolls down from the base material Z, and the aerosol A is dried before moving may occur. Therefore, the amplitude of vibrating the base material Z is preferably 10 mm/sec or less, more preferably 8 mm/sec or less, and still more preferably 5 mm/sec.

The vibration device 34 is not limited, and various known vibrating means capable of vibrating the support 32 can be used according to the support 32 supporting the base material Z. In the present invention, the support (supporting means) supporting the base material Z includes the roller in the roll-to-roll as described above.

Examples of the vibration device 34 include a vibration means using a piezo element, a vibration motor (eccentric motor), a vibration means using a movable coil, and a vibration means using a pneumatic actuator, a hydraulic actuator, and the like. In addition, as the vibration device 34, a commercially available vibrator (vibration device) can be also suitably used.

In the film forming method according to the embodiment of the present invention, the vibrating method of the base material Z is not limited to the method for vibrating the supporting means for the base material Z.

For example, in a case where the base material Z is in a state capable of vibrating alone at the supply position, that is, at the film formation position of the aerosol A to the base material Z, such as a case where the base material Z is supported by the supporting means sandwiching the end portion and a case where the base material Z is transported by the pair of the transport rollers in the roll-to-roll described later, blowing means for blowing and vibrating the base material Z, means for irradiating a sound wave on the base material Z to vibrate the base material Z, for example, a speaker, and the like are also suitably used as the vibrating means for the base material Z.

In the film forming method according to the embodiment of the present invention, at the time of supplying the aerosol A to the base material Z, the base material Z is vibrated at a frequency of 10 kHz or less.

The timing of starting vibration of the base material Z is not limited, but it is preferable to start the vibration of the base material Z before supplying the aerosol A to the base material Z. For example, in the film forming apparatus 10 shown in FIG. 1, it is preferable that, after the vibration of the base material Z (support 32) by the vibration device 34 is started, the driving of the ultrasonic vibrator 26 is started, and then the aerosolization of the raw material liquid L is started.

In the film forming method according to the embodiment of the present invention, in order to suitably improve the film forming speed, it is preferable that the base material Z is always vibrated at a frequency of 10 kHz or less during a state where the aerosol A is supplied to the base material Z. By starting the vibration of the base material Z before starting the supply of the aerosol A to the base material Z, it is possible to reliably bring the base material Z into a state of vibrating at the time of supplying the aerosol A.

In the film forming method according to the embodiment of the present invention, the base material Z may be vibrated in a surface direction of the main surface of the base material Z, in a direction orthogonal to the main surface of the base material Z, or in both directions of the surface direction of the main surface of the base material Z and the direction orthogonal to the main surface of the base material Z. The main surface is the largest surface of a sheet-like material (film and plate-like material).

In addition, the base material Z may be vibrated in a linear reciprocation, or in a trajectory which draw shapes such as a circle, an ellipse, and a polygonal shape.

In the film forming method according to the embodiment of the present invention, at the time of supplying the aerosol A, it is preferable that the base material Z is heated.

Since the aerosol A moves on the base material Z due to the Leidenfrost phenomenon (Leidenfrost effect) by supplying the aerosol A to the base material Z while heating the base material Z, the film forming efficiency can be improved and the film forming speed can be further improved.

The heating temperature of the base material Z is not limited, and it is sufficient that the temperature at which the Leidenfrost phenomenon occurs may be appropriately set according to the solvent used for the raw material liquid L. It is preferable that the heating of the base material Z is performed such that the temperature of the surface of the base material Z is 100° C. or higher, and it is more preferable that the heating of the base material Z is performed such that the temperature of the surface of the base material Z is 150° C. or higher.

It is sufficient that the upper limit of the heating temperature is not higher than a temperature at which the base material Z is damaged, according to the forming material of the base material Z.

Various known heating methods of sheet-like material, such as a method using a heater or the like, can be used for heating the base material Z.

Hereinafter, the act of the film forming apparatus 10 shown in FIG. 1 will be described.

In the film forming apparatus 10 shown in FIG. 1, in a case where the ultrasonic vibrator 26 ultrasonically vibrates in a state where the raw material container 20 contains the raw material liquid L, ultrasonic waves are transmitted to the raw material liquid L through the water W and the raw material liquid L is ultrasonically vibrated.

By ultrasonically vibrating the raw material liquid L, the raw material liquid L is aerosolized. As a result, the aerosol A generated by aerosolizing the raw material liquid L floats in the raw material container 20.

Before the aerosolization of the raw material liquid L, that is, before the start of driving of the ultrasonic vibrator 26, it is preferable that the vibration device 34 is driven to start the vibration of the base material Z, as described above.

Next, the carrier gas is supplied from the gas supply means 28 into the raw material container 20 through the gas supply pipe 28a. The aerosol A floating in the raw material container 20 is transported from the raw material container 20 to the guide pipe 16 by the carrier gas, and is transported from the guide pipe 16 into the casing 30 of the film forming portion 14. The aerosol A may be concentrated by, for example, heating the guide pipe 16 as necessary.

In a case where the aerosol A is transported into the casing 30 of the film forming portion 14, the aerosol A is supplied to the base material Z which is mounted on the support 32. Furthermore, the solvent evaporates from the aerosol A supplied (adhering) to the base material Z, and the film forming material included in the aerosol A (raw material liquid L) forms a film on the base material Z. The aerosol A not served for the film formation is discharged from the outlet 30a of the casing 30.

Here, in the film forming method according to the embodiment of the present invention, since the base material Z is vibrated at a frequency of 10 kHz or less by the vibration device 34, the film forming speed is improved and a film having a target film thickness is obtained more quickly than ordinary aerosol deposition. In addition, in a case of same film forming time, a thicker film is obtained.

In the film forming method according to the embodiment of the present invention, after forming a film on the base material Z, the film may be irradiated with ultraviolet rays, electron beam, and active radiation such as radiations, for example, α-ray, β-ray, γ-ray, and the like as necessary.

For example, in a case where the film forming material is a polymerizable liquid crystal compound, after forming a film on the base material Z, the film may be irradiated with ultraviolet rays to cure (polymerize) the polymerizable liquid crystal compound. Examples of light source generating ultraviolet light include a low-pressure mercury lamp, a medium-pressure mercury lamp, a high-pressure mercury lamp, an ultrahigh-pressure mercury lamp, a carbon arc lamp, a metal halide lamp, a xenon lamp, and LED.

As described above, according to the film forming method according to the embodiment of the present invention, it is possible to improve the film forming speed of the aerosol deposition. Therefore, in the film forming method according to the embodiment of the present invention, a film formation by roll-to-roll can be used, which is difficult to use in the aerosol deposition in the related art.

As well known, the roll-to-roll is a manufacturing method in which the base material Z is sent out from a base material roll obtained by winding a long base material Z to a roll shape, while transporting the long base material Z in the longitudinal direction, the base material Z is continuously subjected to treatments such as film formation, and the treated base material Z is wound into the roll shape again. By using the roll-to-roll, productivity can be significantly improved.

In the following description, the roll-to-roll is also referred to as "RtoR".

Figure 2:
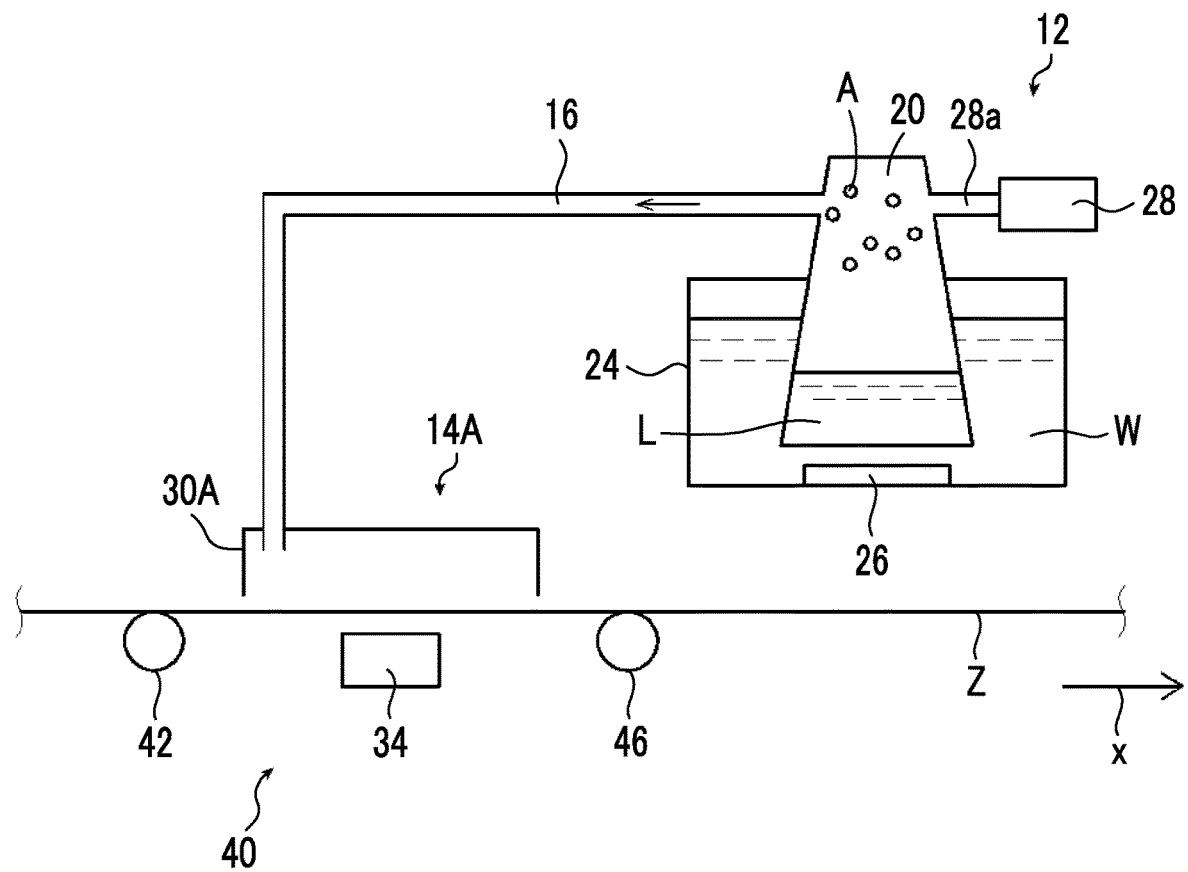
FIG. 2 is a conceptual view for describing another example of the film forming method of the present invention.

FIG. 2 conceptually shows an example of the film forming method according to the embodiment of the present invention using RtoR. Since the film forming apparatus shown in FIG. 2 uses many of the same members as the film forming apparatus 10 shown in FIG. 1, the same members are denoted by the same reference marks, and the description will mainly be given to different parts.

In a film forming apparatus 40 shown in FIG. 2, the long base material Z is transported in the longitudinal direction (in the drawing, direction of arrow x) by a transport roller 42 and a transport roller 46. A pair of the transport rollers may be used instead of the transport rollers.

A casing 30A in a film forming portion 14A a rectangular housing of which a lower surface is opened. In addition, the vibration device 34 is disposed below the base material Z so as to sandwich the base material Z together with the casing 30A. The casing 30A is provided between the transport roller 42 and the transport roller 46 in the transport direction of the base material Z. Therefore, in the film forming apparatus 40, the transport roller 42 and the transport roller 46 become the supporting means of the base material Z.

In the film forming apparatus 40, while the base material Z is transported by the transport roller 42 and the transport roller 46 in the longitudinal direction, a film is formed by supplying the aerosol A when the base material Z passes under the casing 30A.

Here, the base material Z is vibrated at a frequency of 10 kHz by the vibration device 34 disposed below the casing 30A. Therefore, as described above, the film forming speed by the aerosol deposition can be improved and it is also possible to cope with the film formation by RtoR.

In RtoR, blowing means for blowing and vibrating the base material Z, means for irradiating a sound wave on the base material Z to vibrate the base material Z, for example, a speaker, and the like are suitably used as the vibration device 34, as described above. In addition, the base material Z may be vibrated by vibrating the transport roller 42 and/or the transport roller 46 as the supporting means.

As described above, in the present invention, it is preferable to start the vibration of the base material Z before supplying the aerosol A.

Therefore, in the film forming apparatus 40 in the shown example using RtoR, it is preferable that the vibration device 34 vibrates the base material Z from upstream more than the casing 30A, specifically, it is preferable that the vibration device 34 vibrates the base material Z from immediately downstream of the transport roller 42 on the upstream side.

As described above, in the film forming method according to the embodiment of the present invention, before supplying the aerosol A to the base material Z, the surface treatment, the lyophilic treatment, the liquid-repellent treatment, and the like of the base material may be performed.

In a case where RtoR is used in the present invention, by disposing a device (treatment member) for performing these treatments upstream of the casing 30A, the film formation according to the present invention may be performed on the base material Z which is subjected to the surface treatment, the lyophilic treatment, the liquid-repellent treatment, and the like.

Figure 3:
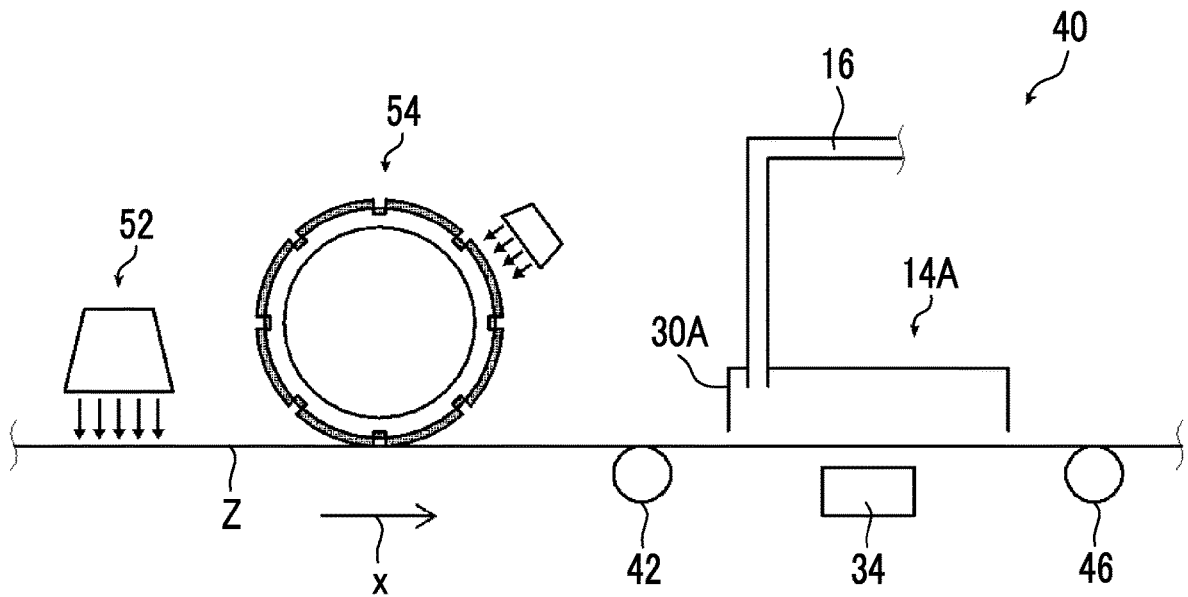
FIG. 3 is a conceptual view for describing another example of the film forming method of the present invention.

For example, as conceptually shown in FIG. 3, a water-repellent pattern transcription device 54 is provided upstream of the film forming apparatus 40 (casing 30A) and a UV ozone treatment device 52 is provided upstream of the water-repellent pattern transcription device 54. In addition, water is used as the solvent of the raw material liquid L.

At this time, while transporting the base material Z in the longitudinal direction (direction of arrow x), first, the entire surface of the base material Z is subjected to a UV ozone treatment using the UV ozone treatment device 52 to be hydrophilized. Next, using the water-repellent pattern transcription device 54, a water-repellent pattern formed by microcontact printing or the like is transferred from the transfer roller 54a to the surface of the base material Z of which the entire surface is hydrophilized. As a result, a pattern of the hydrophilic region and the water-repellent region is formed on the surface of the base material Z.

Thereafter, while transporting the base material Z, by the film forming apparatus 40 according to the film forming method according to the embodiment of the present invention, a film is formed on the base material Z on which the pattern of the hydrophilic region and the water-repellent region is formed. Thereby, the aerosol A adheres in a pattern only to the hydrophilic region, and the film forming material can form a film with a pattern.

While transporting the sheet-shape (cut sheet-shape) base material Z shown in FIG. 1, of which a plurality are arranged in the transport direction, using a transport means such as a belt conveyor and a roller conveyor, by performing the hydrophilic treatment using the UV ozone treatment device 52 and the transcription of the water-repellent pattern using the water-repellent pattern transcription device 54 on transported base material Z, the manufacturing method as shown in FIG. 3 can also be used to the manufacturing method in which a film is formed by the film forming apparatus 40 which performs the film forming method according to the embodiment of the present invention.

Hereinbefore, the film forming method according to the embodiment of the present invention has been described in detail, but the present invention is not limited to the above-described example and various improvements and changes can be made without departing from the spirit of the present invention.

EXAMPLES

Hereinafter, the features of the present invention will be described more specifically with reference to examples. However, the scope of the present invention is not be construed as being limited by the specific examples described below.

Example 1

A raw material liquid having the following composition was prepared.

The density of the prepared raw material liquid was 0.89 g/cm$^3$ and the surface tension thereof was 22 mN/m. The density of the raw material liquid was measured in accordance with JIS Z 8804: 2012. In addition, the surface tension of the raw material liquid was measured by a hanging drop method (pendant drop method).

| | |
|---|---|
| Polymerizable liquid crystal compound (LC-1-1) | 80 parts by mass |
| Polymerizable liquid crystal compound (LC-2) | 20 parts by mass |
| Photopolymerization initiator (manufactured by Chiba Japan Co., Ltd., Irgacure 907) | 3 parts by mass |
| Fluorine polymer (compound 1 described below) | 0.3 parts by mass |
| Methyl ethyl ketone | 170 parts by mass |

Polymerizable liquid crystal compound (LC-1-1)

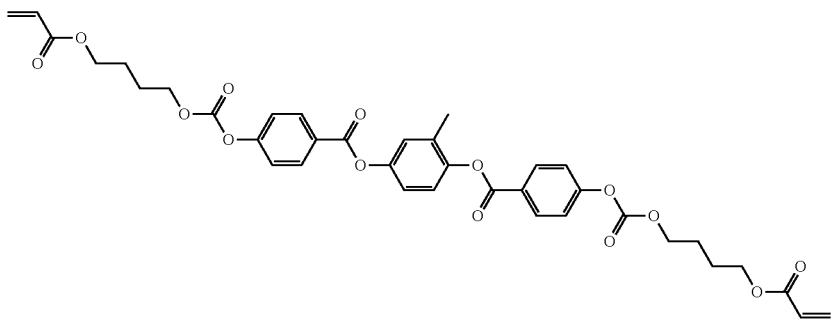 [SMILES: C=CC(=O)OCCCCOC(=O)Oc1ccc(C(=O)Oc2ccc(OC(=O)c3ccc(OC(=O)OCCCCOC(=O)C=C)cc3)c(C)c2)cc1]

Polymerizable liquid crystal compound (LC-2)

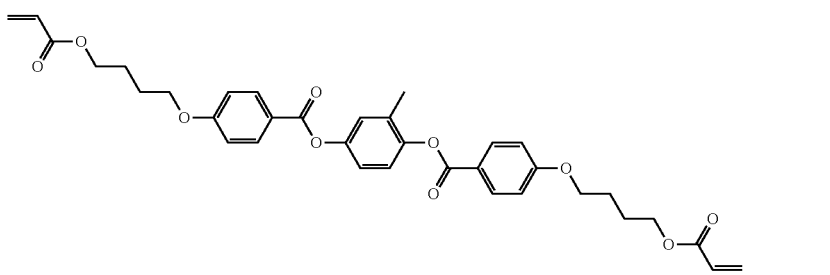 [SMILES: C=CC(=O)OCCCCOc1ccc(C(=O)Oc2ccc(OC(=O)c3ccc(OCCCCOC(=O)C=C)cc3)c(C)c2)cc1]

Compound 1

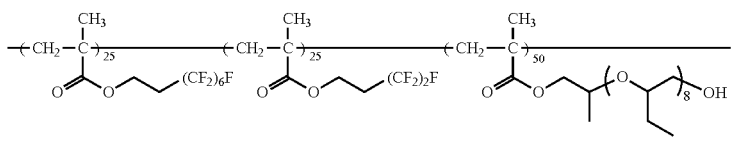

A 100 μm-thick PET film (manufactured by TOYOBO Co., Ltd., COSMOSHINE A4100) was prepared. The PET film was cut into 257×182 mm to obtain a base material.

The base material was subjected to a rubbing treatment. The rubbing treatment was performed using rayon cloth under conditions of pressure: 0.1 kgf, rotation speed: 1000 rpm, and transport speed: 10 m/min.

The base material subjected to the rubbing treatment was mounted on a support of a film forming portion in the film forming apparatus shown in FIG. 1.

In addition, the prepared raw material liquid was contained in a raw material container of an aerosol generating portion.

LW 139. 141-75 manufactured by ARBROWN Co., Ltd. was used as a vibration device of the film forming portion. Using the vibration device, the base material (support) was vibrated at a frequency of 10000 Hz and a vibration speed of 2 mm/sec.

After starting the vibration of the base material, the aerosolization of the raw material liquid was started by vibrating an ultrasonic vibrator of an aerosol generating portion at 1.7 MHz. Therefore, in this example, the particle size of the aerosol calculated by the above equation was 2.5 μm. IM4-36D manufactured by SEIKO GIKEN INC. was used as the ultrasonic vibrator.

Next, air was supplied from a gas supply means to the raw material container as a carrier gas. The supply amount of the carrier gas was $2.8 \times 10^{-3}$ m$^3$/min as a flow rate.

In this way, the aerosol was supplied to the base material (PET film) mounted on the support for 60 seconds to form a film on a surface (rubbing treated surface) of the base material.

After forming a film for 60 seconds, the base material was taken out of the film forming portion, and heated by irradiating hot air at a temperature of 80° C. and a wind speed of 2 m/min for 60 seconds.

Thereafter, the base material was placed on the hot plate at 30° C. and irradiated with ultraviolet rays for 6 seconds using a ultraviolet ray irradiator (manufactured by Fusion UV Systems, electrodeless lamp "D bulb", illuminance of 60 mW/cm$^2$) to fix a liquid crystal layer, thereby forming a liquid crystal film.

The thickness of the formed liquid crystal film was 4.0 μm. Using a reflecting spectrographic film thickness meter (manufactured by OTSUKA ELECTRONICS Co., Ltd, FE 3000), the film thickness of the liquid crystal film was measured.

Examples 2 to 5, Comparative Example 1

Liquid crystal films were formed and the film thickness was measured in the same manner as in Example 1, except that the frequency of vibrating the base material was changed to 1000 Hz (Example 2), 500 Hz (Example 3), 50 Hz (Example 4), 5 Hz (Example 5), and 15000 Hz (Comparative Example 1).

Comparative Example 2

A Liquid crystal film was formed and the film thickness was measured in the same manner as in Example 1, except that the base material was not vibrated.

Example 6

A Liquid crystal film was formed and the film thickness was measured in the same manner as in Example 1, except that, by heating the support, the base material was heated such that the temperature of the surface of the base material is 100° C.

As a result, the thickness of the formed liquid crystal film was 4.5 μm. That is, by heating the base material, a liquid crystal film thicker than that of Example 1 in which the film was formed on the base material at room temperature could be formed. The room temperature is 25° C.

Example 7

A Liquid crystal film was formed and the film thickness was measured in the same manner as in Example 1, except that the vibration of the base material was started 20 seconds after starting the supply of the carrier gas, that is, the film formation.

As a result, the thickness of the formed liquid crystal film was 2.8 μm. That is, although thinner than the film in Example 1 in which the aerosolization of the raw material liquid is started by vibrating the ultrasonic vibrator of the aerosol generating portion after starting the vibration of the base material, a thick film could be formed.

The results are shown in the table.

In the following evaluation, a case where the film thickness of the liquid crystal film is 3 μm or more is "very good", a case where the film thickness of the liquid crystal film is 1 μm or more and less than 3 μm is "good", and a case where the film thickness of the liquid crystal film is less than 1 μm is "bad".

TABLE 1

|  | Vibration frequency of base material [Hz] | Start of vibrating base material (before starting film formation/after starting film formation) | Heating base material [° C.] | Film thickness [μm] | Evaluation |
| --- | --- | --- | --- | --- | --- |
| Example 1 | 10000 | Before | None | 4.0 | Very good |
| Example 2 | 1000 | Before | None | 3.5 | Very good |
| Example 3 | 500 | Before | None | 3.3 | Very good |
| Example 4 | 50 | Before | None | 3.0 | Very good |
| Example 5 | 5 | Before | None | 2.5 | Good |
| Example 6 | 10000 | Before | 100 | 4.5 | Very good |
| Example 7 | 10000 | After | None | 2.8 | Good |
| Comparative Example 1 | 15000 | Before | None | 0.8 | Bad |
| Comparative Example 2 | Not vibrating | — | None | 0.3 | Bad |

As shown in Table 1, according to the present invention in which the base material is vibrated at a frequency of 10 kHz or less during supplying the aerosol, the film forming speed of forming a film by the aerosol deposition can be improved. In particular, by vibrating the base material at a frequency of 50 Hz or more, a sufficiently thick film can be formed as compared with the related art. In addition, as shown in Example 6, by heating the base material, a thicker film can be formed, that is, the film forming speed of forming a film by the aerosol deposition can be improved. Furthermore, as shown in Example 1, by starting the vibration of the base material before starting the aerosolization of the raw material liquid, a thicker film can be formed, that is, the film forming speed of forming a film by the aerosol deposition can be improved.

In contrast, in Comparative Example 1 in which the base material was vibrated at 15000 kHz, it is considered that the aerosol adhering to the base material was not retained as a liquid, and was released again as aerosol. Therefore, although the base material was vibrated, the film thickness of the formed liquid crystal film was extremely thin as compared with the present invention, that is, the film forming speed is low.

In addition, also in Comparative Example 2 in which the base material was not vibrated, a film was not formed at a sufficient film forming speed.

From the above results, the effect of the present invention is clear.

For example, the present invention can be suitably used for manufacturing optical elements, manufacturing semiconductor elements, manufacturing electric elements, manufacturing solar cells, and the like.

EXPLANATION OF REFERENCES 10, 40: film forming apparatus
12: aerosol generating portion
14, 14A: film forming portion
16: guide pipe
20: raw material container
24: container
26: ultrasonic vibrator
28: gas supply means
28a: gas supply pipe
30, 30A: casing
32: support
34: vibration device
42, 46: transport roller
52: UV ozone treatment device
54: water-repellent pattern transcription device
A: aerosol
L: raw material liquid
W: water
Z: base material

What is claimed is:

1. A film forming method comprising:
making a raw material liquid including a film forming material into a liquid particle floating in a gas;
mixing the liquid particle and the gas around the liquid particle to obtain an aerosol;
supplying the aerosol to a base material vibrating at a frequency of 10 kHz or less; and
forming a film of the film forming material on the base material,
wherein the vibration of the base material is started before supplying the aerosol to the base material.

2. The film forming method according to claim 1, wherein the formed film is irradiated with an active radiation after forming a film of the film forming material on the base material.

3. The film forming method according to claim 1, wherein the aerosol is supplied to the base material while heating the base material.

4. The film forming method according to claim 3, wherein the base material is heated such that a temperature of a surface of the base material is 100° C. or higher.

5. The film forming method according to claim 1, wherein a vibration speed of the base material is 0.1 mm/sec or more.

6. The film forming method according to claim 1, wherein the vibration of the base material is performed by one or more of irradiating the base material with a sound wave, blowing of air to the base material, and vibrating a supporting means of the base material.

7. The film forming method according to claim 1, wherein a film forming surface of the base material has a region having lyophilicity to the raw material liquid and a region having liquid repellency to the raw material liquid.

8. The film forming method according to claim 1, wherein a surface treatment of the base material is performed before supplying the aerosol to the base material.

9. The film forming method according to claim 8, wherein the surface treatment of the base material is one or more of a rubbing treatment, a lyophilic treatment, a liquid-repellent treatment, and a formation of a base layer.

10. The film forming method according to claim 1, wherein the film forming material is a liquid crystal compound.

* * * * *